United States Patent [19]

Kimura et al.

[11] 4,346,988

[45] Aug. 31, 1982

[54] DISTANCE MEASURING DEVICE

[75] Inventors: Hiroyuki Kimura, Kawasaki; Shuichi Tamura, Yokohama; Hideo Yokota, Tokyo, all of Japan

[73] Assignee: Canon Kabushiki Kaisha, Tokyo, Japan

[21] Appl. No.: 91,777

[22] Filed: Nov. 6, 1979

[30] Foreign Application Priority Data

Nov. 10, 1978 [JP] Japan ................. 53-138438

[51] Int. Cl.$^3$ .................. G01C 3/00; G01C 5/00; H01L 9/00
[52] U.S. Cl. ...................... 356/1; 250/552; 356/4
[58] Field of Search ............ 356/1, 4; 250/552

[56] References Cited

U.S. PATENT DOCUMENTS 3,435,744  4/1969  Stimson ...................... 356/4

Primary Examiner—S. C. Buczinski
Attorney, Agent, or Firm—Toren, McGeady & Stanger

[57] ABSTRACT

A distance measuring device having a light projector and a light receptor, at least one of which is caused to move so that when the intersection of their optical paths is disposed at an object, its coincidence is detected by the signal generated in the light receptor for measuring the distance from the device to the object based on the triangulation. In order to obtain a clear peak signal, according to the invention, for the light source, use is made of a light energy distribution characteristic which is higher at the marginal zone than at the central zone.

3 Claims, 8 Drawing Figures

FIG.4
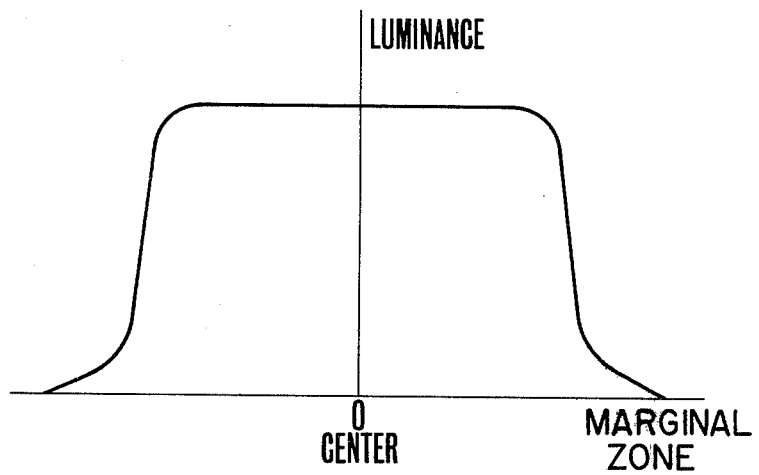
FIG.5
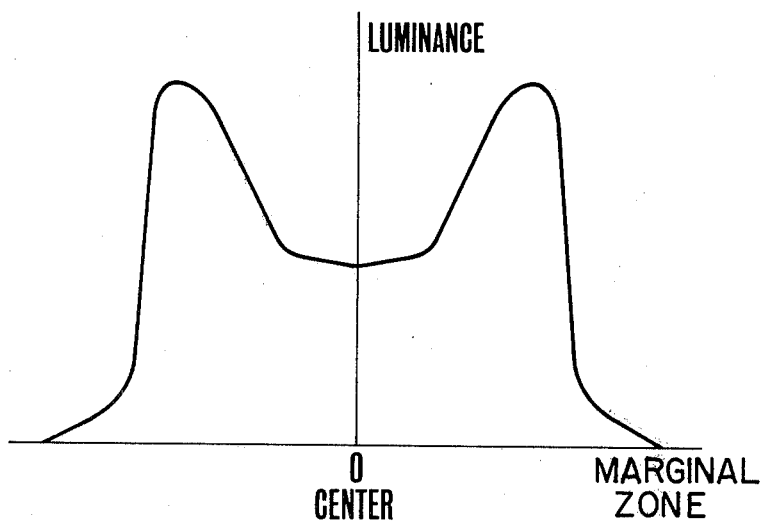
FIG.6 FIG.7
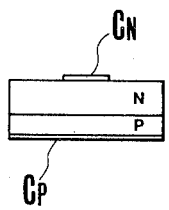 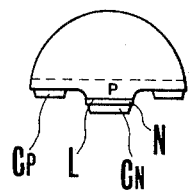

DISTANCE MEASURING DEVICE

BACKGROUND OF THE INVENTION

This invention relates to distance measuring devices.

It is known to provide a so called active type distance detecting device in which a light projector and a light receptor are arranged in spaced relation by a predetermined base line distance so that while a target area is scanned by light projected from the light projector, the reflected light from an object in the target area is received by the light receptor whose electrical output signal is processed to detect a peak value indicative of a distance from the device to the object.

Such device, however, has a disadvantage that the reflected light from the object being scanned includes light components emanating from the outside of the light projector, such as ambient light, which serves as a noise, so that it is difficult to detect the peak. Another disadvantage is that the electrical signal produced from the light receptor, when being passed through the electrical circuit that follows, suffers from noise with the resultant peak being made ambiguous.

To achieve a higher accuracy of distance measurement, such influence of noise must be reduced. In this sense, the sharper the point of peak of the electrical signal, the better the result.

SUMMARY OF THE INVENTION

The present invention is to provide a distance measuring device with a light source having its luminance distribution modified so as to cause production of a sharp peak, thus the accuracy of distance measurement is improved.

The present invention will be better understood when reference is had to the following drawings in which:

BRIEF DESCRIPTION OF THE DRAWINGS

FIG. 4 is a graph showing a luminance distribution over the light emitting area of the conventional light source.

FIG. 5 is a graph showing a luminance distribution over the light emitting area of a light source in the present invention.

FIG. 6 is a cross-sectional view of a light-emitting diode used as the conventional light source.

FIG. 7 is a cross-sectional view of a light-emitting diode used in the present invention.

DESCRIPTION OF THE PREFERRED EMBODIMENT

Figure 1:
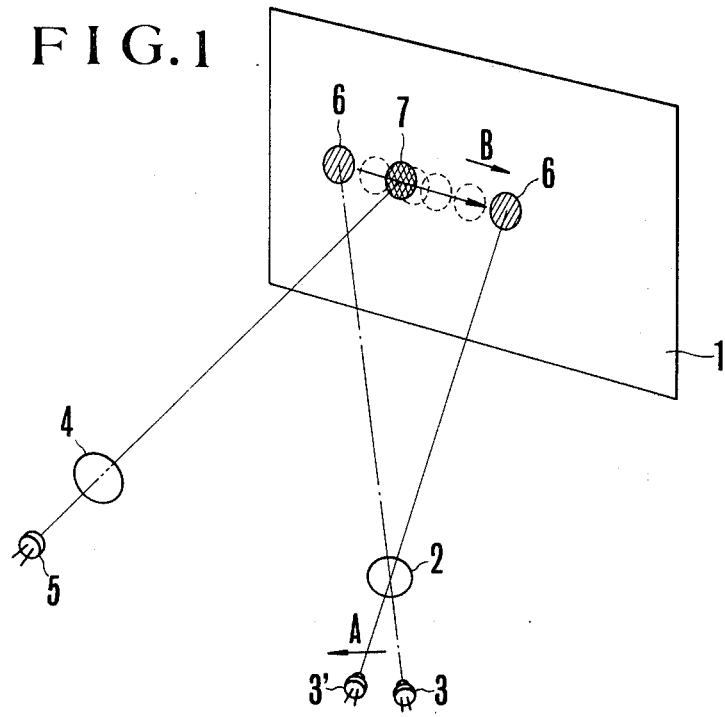
FIGS. 1 and 2 are schematic views for explaining the principles of a distance measuring device with FIG. 1 showing a manner in which a projection light scans a target area, and FIG. 2 being a geometric diagram for explanation of the triangular surveying method.
Figure 2:
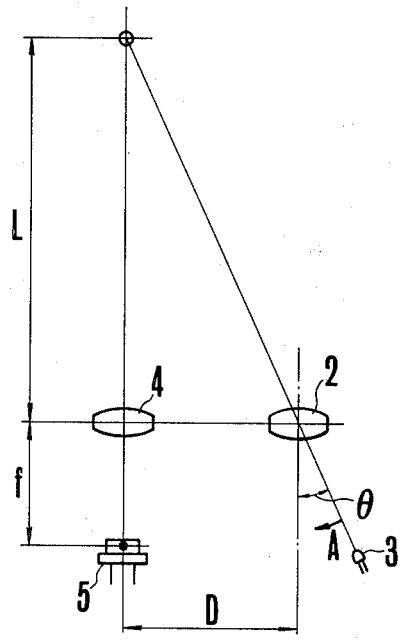

In FIG. 1, an object whose distance from the device is to be measured lies in a target area 1. Positioned in front of a light source such as an infrared light emitting diode 3 (hereinafter abbreviated as LED) is a collimating lens 2 with its focal point coinciding with the light emitting area of the LED so that on the target plane 1 there is formed a spot-like illumination domain as shown at 6. A light receptor 5 having a light sensitive element such as silicon photo-cell (SPC) is positioned behind a condenser lens 4 at or near the focal point thereof to be sensitive to light from a predetermined domain 7 of dimensions almost equal to that of the illumination domain 6 on the target area 1. When the light projector 3 is moved along an excursion path in a plane containing the both optical axes of the lenses 2 and 4 in a direction indicated by arrow A, the illuminated domain 6 is moved in a direction indicated by arrow B upon scanning across the sight domain 7 to cause the light return to be incident upon the light receptor 5 which then produces an electrical signal. When this electrical signal has reached a peak, an instantaneous reading of the angle of deflection of the light projector will result in the finding the distance between the device and the intersection of the two optical paths. This is based on the principle of triangulation shown in FIG. 2. Letting L denote the distance from the lens 4 to the intersection point 7, D the distance between the two lenses 2 and 4 in the base line, and $\theta$ the angle of deflection of the projector 3 with respect to the optical axis of the lens 2, we have $$L = \frac{D}{\tan \theta}$$

Figure 3:
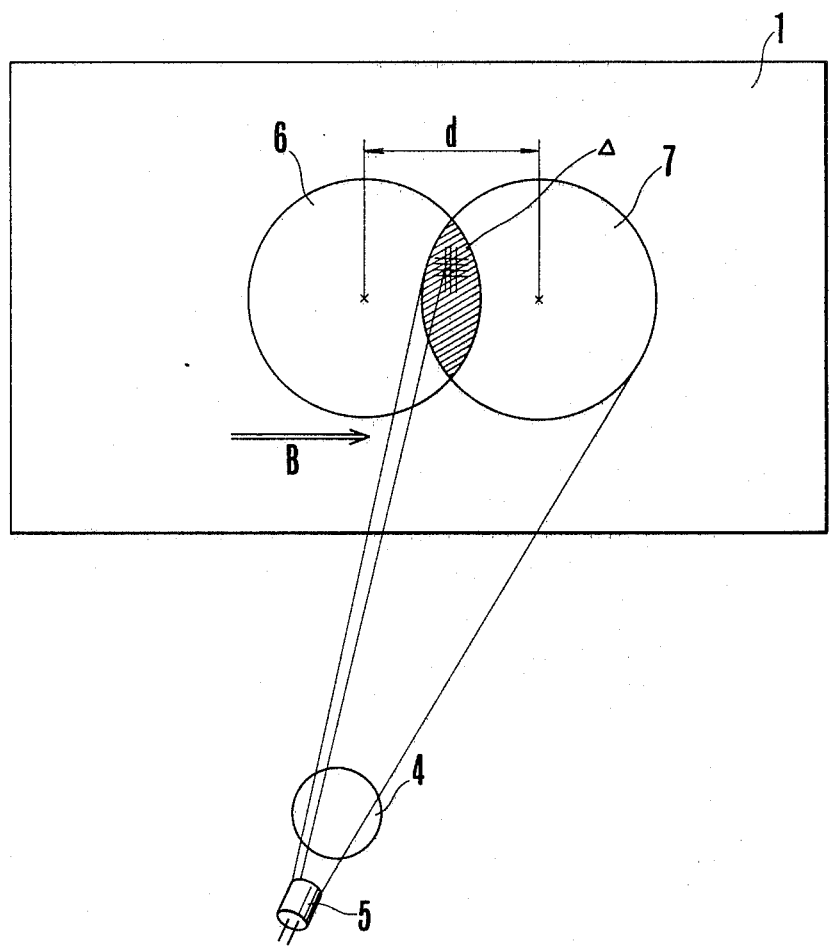
FIG. 3 is a schematic view showing a condition that the cross-section of a light bundle projected from the light source onto a target plane overlaps on a part of a domain from which the reflected light returns to the light receptor.

At this time, as shown in FIG. 3, for a minor region $\Delta$ taken within the overlapped area of the cross-sections of the light projection path 6 and the light transmission path 7, the corresponding output of the light sensitive transducer 5 may be considered to be proportional to the product of the illumination $A(\Delta)$ at the point of position $\Delta$ by the projection light and the sensitivity $R(\Delta)$ of the light receiving surface of the transducer at the corresponding area to that common point $\Delta$. As the distance between the centers of the cross-section of the two optical paths in the target plane is varied, therefore, the output $E(d)$ of the transducer 5 may be expressed by the sum of output components corresponding to all minor regions over the overlapped area, that is, $$E(d) = \sum_\Delta A(\Delta) \cdot R(\Delta)$$

Figure 8:
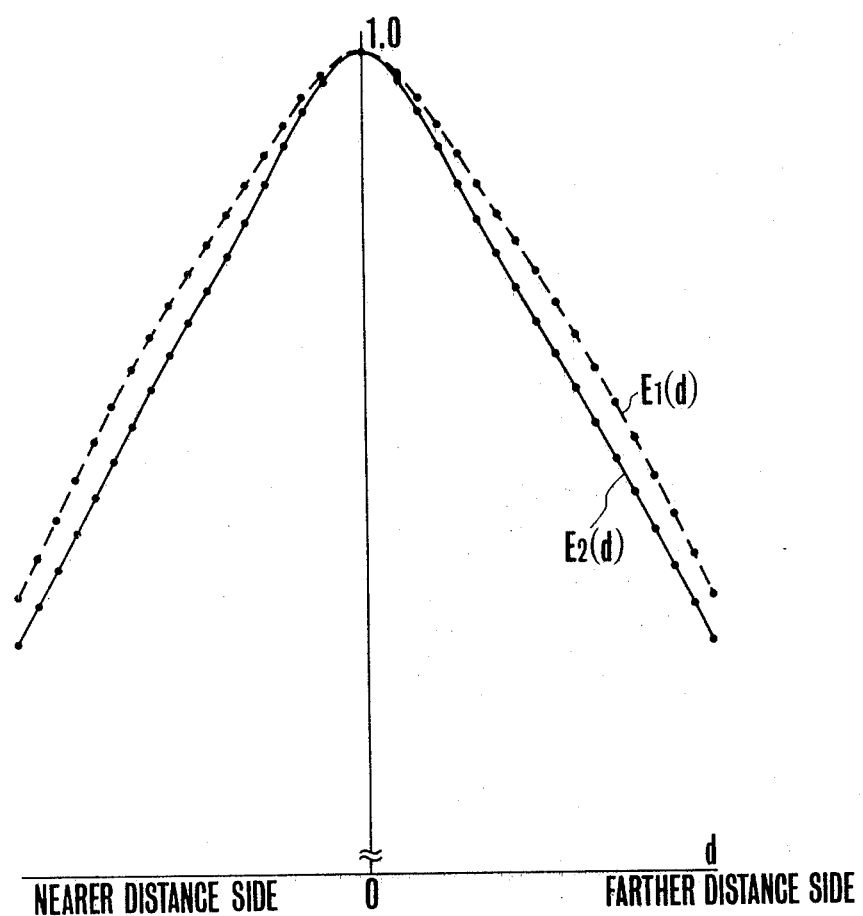
FIG. 8 is a graph showing variations of the output of the light receptor with excursion distance.

The conventional LED shown in FIG. 6 has an almost uniform luminance distribution over the entire area of light emitting surface as shown in FIG. 4, and, therefore, the distribution of illumination in the scanning area 6 is also almost uniform. With such LED used as the light source, the output of the light sensitive transducer varies with the separation between the centers of the cross-sections of the two optical paths 6 and 7 as shown in FIG. 8 by a curve labelled $E_1(d)$ with its peak occurring when $d=0$, or when the illuminated domain comes to coincide with the sight domain. In order to further sharpen this peak, it is required to reduce the area of light-emitting surface of the LED and to increase the luminance thereof so that the rate of reduction of the output with the central separation d from the peak value ($d=0$) is increased. Since the intensity of current per unit area of the light-emitting surface is limited, it is difficult to increase the luminance much more.

The present invention employs an LED having a luminance distribution which takes a high value in the marginal zone and a low value in the central zone so that an almost similar illumination distribution is given to the cross-section of the metering light beam in the target plane to thereby increase the rate of reduction of the output of the transducer in the neighborhood of the peak.

The use of such LED provides a solid line curve labelled $E_2(d)$ in FIG. 8 which is obtained based on the above described formula. (It is noted that these two curves $E_1(d)$ and $E_2(d)$ are illustrative with the peaks normalized to unity). By comparison of these two curves $E_1(d)$ and $E_2(d)$ with each other, it is found that the output of the light sensitive transducer in the present invention is made sharper by about 30% in terms of the ratio of reduction from the peak:

$$\frac{1 - E_2(d)}{1 - E_1(d)}$$

in the neighborhood of $d=0$. This has also proven to be valid experimentally.

FIG. 7 shows an example of structure of the LED having the luminance distribution shown in FIG. 5. A semi-spherical P type semi-conductor P is fabricated with a small round N type semi-conductor joined at the center of the area of the round plat surface thereof. On the opposite surface of the N type semi-conductor layer, there is an N pole electrode $C_N$. In the vicinity of the periphery of the round plat surface of the P type semi-conductor is an integral P type electrode $C_P$ surrounding the above-described P-N junction. This structure permits the current density in the P-N junction to progressively increase as the diameter increases. Thus, the above-described luminance distribution is established. Further, a good efficiency of radiation of heat can be obtained, and therefore a relatively large increase in luminance is achieved.

The present invention is not confined to the structure of FIG. 7 for the above-described luminance distribution. For example, the P-N junction may be of a ring shape to effect an equivalent result thereto. In the embodiment described above, the light projector is shown in the form of an LED, and the light receptor in the form of a SPC. But the present invention is not confined thereto. Any combination of a projector for giving off something like radiant energy with a transducer sensitive to that radiant energy will suffice in constructing the device of the invention. Although the present invention has been described in connection with the use of the lenses in establishing a prescribed orientation of function, any other method may be employed provided that the prescribed orientation of function can be preserved.

What is claimed is:

1. A distance measuring device for measuring a distance from the device to an object by the triangulation principle having:
    (a) light source means provided with a light source and light projecting means and positioned to define a predetermined illumination domain on said object;
    (b) light sensitive means arranged in spaced relation from said light source means by a predetermined distance and responsive to light reflected from said projection domain for producing a predetermined signal;
    (c) either said light source means or said light sensitive means being movable along a predetermined path; and
    (d) said light source being constructed to provide a higher radiant energy density at its marginal zone of a light emitting surface thereof than at its central zone at least on a cross section of the light emitting surface along a plane containing the optical axis of the light source means and the optical axis of the light sensitive means, while the projection domain on the object has a corresponding energy density distribution as said light source.

2. A distance measuring device for measuring a distance from the device to an object by the triangulation principle having:
    (a) light source means provided with a light emitting source and a projection lens and positioned to illuminate an object in a predetermined domain, said illuminated domain being moved across said object along a predetermined path;
    (b) light sensitive transducer means arranged in spaced relation to said light source by a predetermined distance, provided with a light sensitive element and a condenser lens, receptive of light reflected from a predetermined sighted domain on said object, and responsive to coincidence of said illuminated domain with said sighted domain for producing a signal;
    (c) said light source having a higher radiant energy density at its marginal zone in a light emitting area thereof than that at its central zone, while said illuminated domain also has a similar energy distribution to that of said light source; and
    (d) said illuminated domain and said sighted domain having equal areas on said object.

3. A distance measuring device according to claim 2, wherein said light source is a light-emitting diode.

* * * * *